United States Patent
Toyota et al.

[11] Patent Number: 6,065,776
[45] Date of Patent: May 23, 2000

[54] SEAT BELT ASSEMBLIES FOR VEHICLE

[75] Inventors: Minoru Toyota, Hiroshima; Toshinori Sakamoto; Koji Nakao, both of Higashihiroshima; Satoshi Nishikaji, Hiroshima, all of Japan

[73] Assignee: Mazda Motor Corporation, Hiroshima-ken, Japan

[21] Appl. No.: 09/260,419

[22] Filed: Mar. 1, 1999

[30] Foreign Application Priority Data

Mar. 5, 1998 [JP] Japan .................................. 10-053164

[51] Int. Cl.⁷ .................................................. B60R 21/10
[52] U.S. Cl. ...................................... 280/801.1; 280/808
[58] Field of Search ................................ 280/801.1, 808

[56] References Cited

U.S. PATENT DOCUMENTS

| 4,541,654 | 9/1985 | Jonasson | 280/801.1 |
|---|---|---|---|
| 4,568,107 | 2/1986 | Biviano | 280/808 |
| 4,915,413 | 4/1990 | Meyer | 280/801.1 |
| 5,253,896 | 10/1993 | Verbeski | 280/808 |

FOREIGN PATENT DOCUMENTS

| 0 532 378 A1 | 3/1991 | European Pat. Off. . |
|---|---|---|
| 06263995 | 9/1994 | Japan . |

*Primary Examiner*—Kenneth R. Rice
*Attorney, Agent, or Firm*—Brooks & Kushman P.C.

[57] ABSTRACT

In a vehicle having a second row of seats designed for providing seats for three passengers and a third row of seats which are detachable, a seat belt unit for the third row has a webbing whose length is enough to reach a center seat of the second row, and which is pulled out via an anchor, as a fulcrum, designed rotatable to a position where it faces to the center seat. With this configuration, an elevation of the seats in the third row is set higher than that in the second row as well as an elevation of a mounting position of the anchor is set higher than that of an anchor for a second row seat belt unit, so that a passenger in the center seat is properly protected by the seat belt unit.

7 Claims, 7 Drawing Sheets

SEAT BELT ASSEMBLIES FOR VEHICLE

BACKGROUND OF THE INVENTION

The present invention relates to seat belt assemblies for a vehicle and, more particularly to, seat belt assemblies for a vehicle, having plural row of seats, suitable for protecting a passenger sitting on a center seat in an arbitrary row, except the last row.

Conventionally, a seat belt unit, for a rear seat, whose retractor(winder) is arranged within a rear fender is known (refer to Japanese Patent Application Laid-Open No. 6-263005). In this type of seat belt unit, retractors are mounted on the tops of strut type suspension units which are located at the sides of the back of the rear seats (in a case where there are a plurality of separate backs of the respective seats, then at the right and the left sides of the rightmost and the leftmost backs, respectively), and anchors(slip guides) are mounted on the rear pillars which are located above the retractors. The direction of each webbing, pulled out from the retractor, is changed to the front lower oblique direction by the anchor. In this manner, the seat belt unit is installed for a rear seat.

Figure 1:
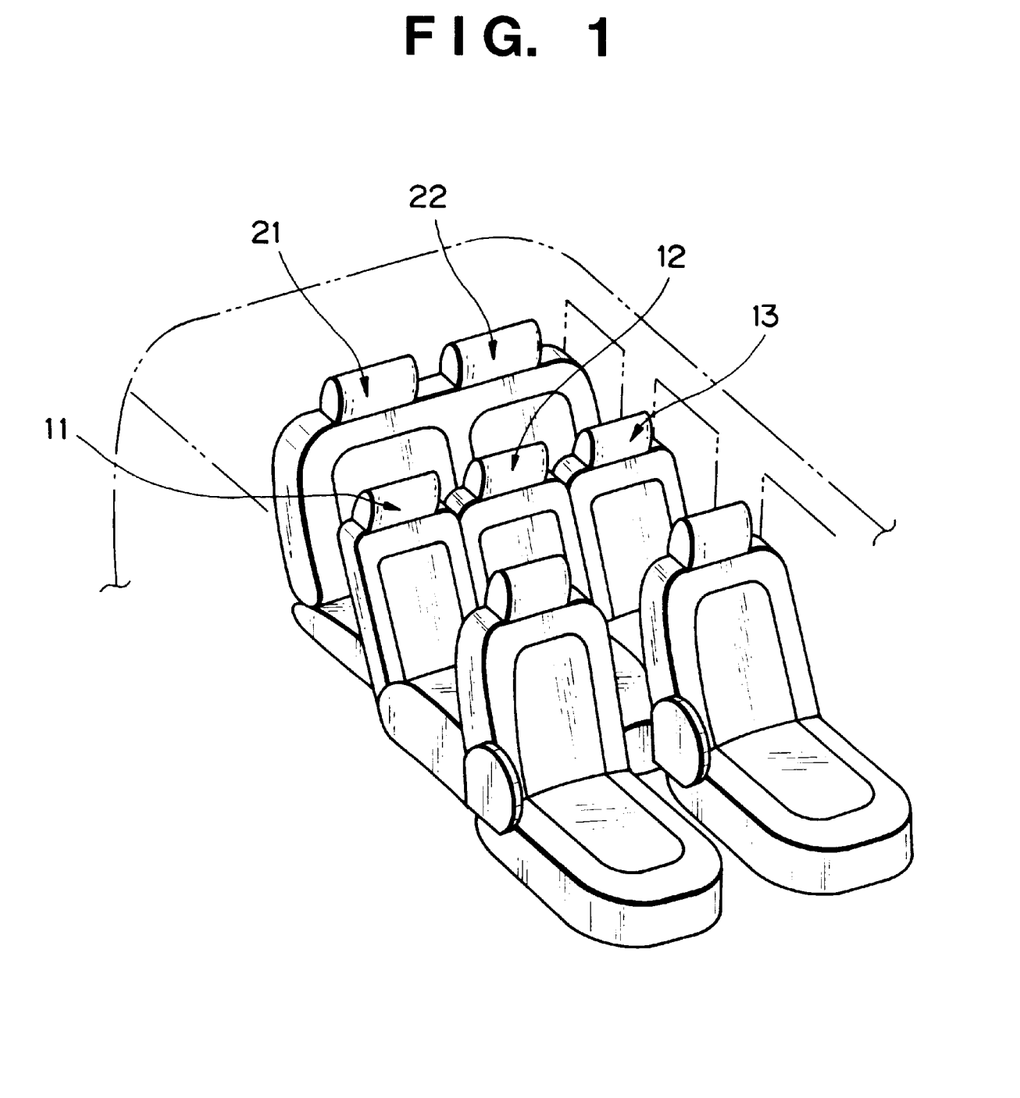
FIG. 1 is a perspective view showing an arrangement of seats in a vehicle to which seat belt assemblies for the vehicle according to the embodiment of the present invention is provided.

As shown in FIG. 1, one known vehicle seating arrangement provides seats arranged in three rows, in the length direction of a vehicle, where the second row is designed for providing seats for three passengers, and seat or seats in third row are detachable or foldable, so as to provide room for freight by detaching or folding the seat or seats in the third row.

In a vehicle of this type, three-point support type seat belt units are provided for a right seat 21 and a left seat 22 in the third row. When a seat or seats in the third row are detached or folded, for instance, the seat belt unit or units for the third row become useless.

Further, three-point support type seat belt units are also provided for a right seat 11 and a left seat 13 in the second row, however, no seat belt unit or a two-point support type seat belt unit is generally provided for a center seat 12.

However, it is preferable to provide a three-point support type seat belt unit for the center seat 12 for a security purpose to protect a passenger seating there.

Accordingly, it is considered to provide a three-point support type seat belt unit for the center seat 12 within either right or left fender. In such a case, however, since the retractors of the seat belt units for the right seat 11 and the left seat 13 are already mounted in both of the right and left fenders, it is difficult to realize the above arrangement due to problems of space and strength for mounting an extra retractor in the fender.

Further, different types of vehicles, using vehicle bodies of the same type, are manufactured, such as a van having two rows of seats, and a station wagon having three rows of seats. When three rows of seats are arranged, it is tended to provide no seat belt unit for the center seat of the second row, whereas, when two rows of seats are installed, it is tended to provide a three-point support type seat belt unit for the center seat of the rear row. However, in such cases, it is necessary to change the mounting positions of seat belt units for the different types of vehicles, which increases manufacturing cost.

Furthermore, there is a station wagon which allows a user to change the number of rows of seats, between two and three, depending upon user utilization. Accordingly, it is necessary to design an arrangement of seat belt units by taking all the possible seat arrangements into consideration, which increases the cost of a vehicle.

SUMMARY OF THE INVENTION

The present invention has been made in consideration of the above situation, and has as its object to design a seat belt unit for the last row, in a vehicle having plural rows of seats where the second to the last seat row is for providing seats for three passengers, so as to be usable in the second to the last seat row.

According to the present invention, the foregoing object is attained by providing seat belt assemblies for a vehicle in which plural rows of seats are arranged in a length direction of the vehicle and a second to the last seat row is designed for providing seats for three passengers. In the seat belt assemblies, a seat belt unit for protecting a passenger on a seat in a last row is configured so that a webbing is pulled out via an anchor, as a fulcrum, provided on a rear pillar of the vehicle, and has enough length to be used as a webbing for protecting a passenger on a center seat, in the width direction, of the second to the last seat row.

With the aforesaid configuration, it is possible to pull out the webbing of the seat belt unit for the last row until it reaches the center seat of the second to the last seat row, thus, the seat belt unit for the last row is also used for the center seat of the second to the last seat row. Accordingly, the seat belt unit can be shared by the last row and the center seat of the second to the last seat row, thereby it becomes unnecessary to provide a seat belt unit exclusively for the center seat of the second to the last seat row.

Further, when designing a van and a station wagon using the same type of vehicle bodies, it is unnecessary to change arrangements of seat belt units for each respective vehicle, since seat belt assemblies of the same type can be used in both types of vehicles. As a result, manufacturing cost is reduced.

Furthermore, in a station wagon, the seat belt unit for the last row is also used for the center seat of the second to the last seat row, thereby, it is unnecessary to design an arrangement of seat belt units by taking the possible seat arrangements into consideration, which reduces cost for designing the vehicle.

Preferably, the webbing has a fixed tang which is provided at an end of the webbing and a slide tang designed to be slide along the webbing.

By the above configuration, an optimized configuration of the seat belt unit of the present invention is specified. More specifically, according to the seat belt unit, the fixed tang is engaged with a buckle provided on one side of a seated passenger, then a slide tang is engaged with a buckle provided on the other side of the passenger, thereby the seat belt unit functions as a three-point support type seat belt unit for the passenger. With the foregoing configuration, only a base end of the webbing has to be fixed on the vehicle body, and it is not necessary to fix the both ends, i.e., the base end and a top end, of the webbing to the vehicle body for configuring a three-point support seat belt unit. Accordingly, the webbing of the seat belt unit provided for the last row can be easily pulled out to the position of the center seat of the second to the last seat row, thereby it is possible to use the seat belt unit provided for the last row for the center seat of the second to the last seat row under proper state of the webbing.

Preferably, a seat belt unit for protecting a passenger in a rightmost or leftmost seat, in the width direction, of the second to the last seat row is provided, and a mounting position of an anchor for the webbing of the seat belt unit for the last row is higher than a mounting position of an anchor, as a fulcrum, used when pulling out a webbing of the seat belt unit for the second to the last seat row.

With the above configuration, by arranging the anchor of the seat belt unit for the last row in the elevated position, when using the seat belt unit, provided for the last row, for the center seat of the second to the last seat row, it is possible to pull the webbing from the rear upper position to the front with respect to a passenger seated in the center seat. Accordingly, the webbing is provided at an optimum angle for the passenger seated in the center seat, thus, it is possible to protect the passenger.

Further, the anchor for the webbing of the seat belt unit for the last row is preferably provided on the rear pillar of the vehicle, and a rotatable range of the anchor about a rotation axis is between a direction for pulling out the webbing toward the last row of seats and a direction for pulling out the webbing toward a seat in the second to the last seat row.

With this configuration, when using the seat belt unit, provided for the last row, for the center seat of the second to the last seat row, the angle of the webbing is changed to a proper angle.

Further, an elevation of a seat of the last row is preferably higher than an elevation of a seat of the second to the last seat row.

With this configuration, since the position of seats in the last row is arranged in an elevated position from the position in the second to the last seat row, in a case where the anchor of the seat belt unit for the last row is arranged in the upper position, the webbing is provided at an optimum angle for the passenger seated in the last row. Accordingly, the webbing is arranged at the best angle for both a passenger seated in the last row and a passenger seated in the center seat of the second to the last seat row, thereby it is possible to protect both passengers.

Further, the foregoing object is also attained by providing seat belt assemblies for a vehicle in which three rows of seats are arranged in a length direction of the vehicle, the second row is designed for providing seats for three passengers, and a seat or seats in the third row is/are detachable or foldable. In the seat belt assemblies, a seat belt unit for protecting a passenger on a seat of the third row is configured so that a webbing is pulled out via an anchor, as a fulcrum, provided on a rear pillar of the vehicle, has enough length to be used as a webbing for protecting a passenger on a center seat, in the width direction, of the second row, has a fixed tang which is provided at an end of said webbing and a slide tang designed to be slid along said webbing, and is designed to be stored behind a trim panel when wound by a retractor when it is not used.

With the above configuration, the seat belt unit for the third row can be used as a seat belt unit for the center seat of the second row when the third row is not used, thereby realizing an effective use of the seat belt unit provided for the third row.

Further, when the seat belt unit for the third row is not used, the webbing is wound up by the retractor. Since a top (clamping) end of the webbing is not fixed to the vehicle body, the webbing is wound up until the fixed tang provided at the end reaches the anchor, and the webbing is stored behind a trim panel. As a result, when the third row is detached to make room for freight behind the second row, for instance, it is possible to prevent the webbing tangling with the freight while loading and unloading the freight. In addition, the webbing is not visible when it is not used, thus, the interior of the vehicle looks attractive.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will be described in detail below in accordance with the accompanying drawings.

FIG. 1 shows an arrangement of seats in a vehicle to which seat belt assemblies for the vehicle according to the embodiment of the present invention are applied. The vehicle has a multiple row seating configuration such as used in, a station wagon in which three rows of seats are arranged in the length direction of the vehicle. Among the three rows of seats, the second row is designed for providing seats for three passengers. Further, the third row, i.e., the last row, is designed for providing seats for two passengers. A seat or seats in the third row are designed to be detachable or foldable, and when the seat or seats in the third row are detached or folded, room for freight is provided behind the second row.

Figure 2:
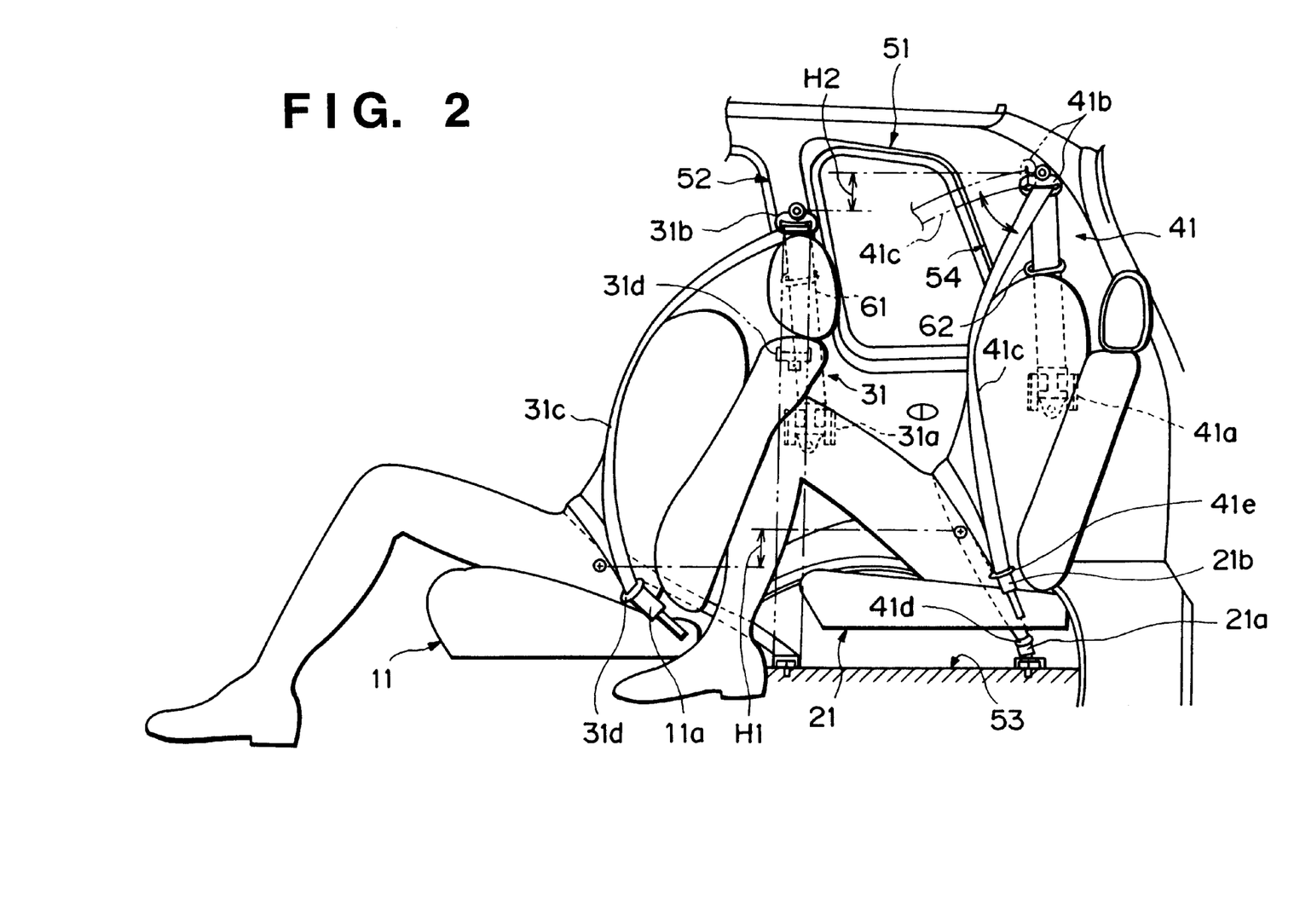
FIG. 2 is a side view showing a rear part of the inside of the vehicle.
Figure 3:
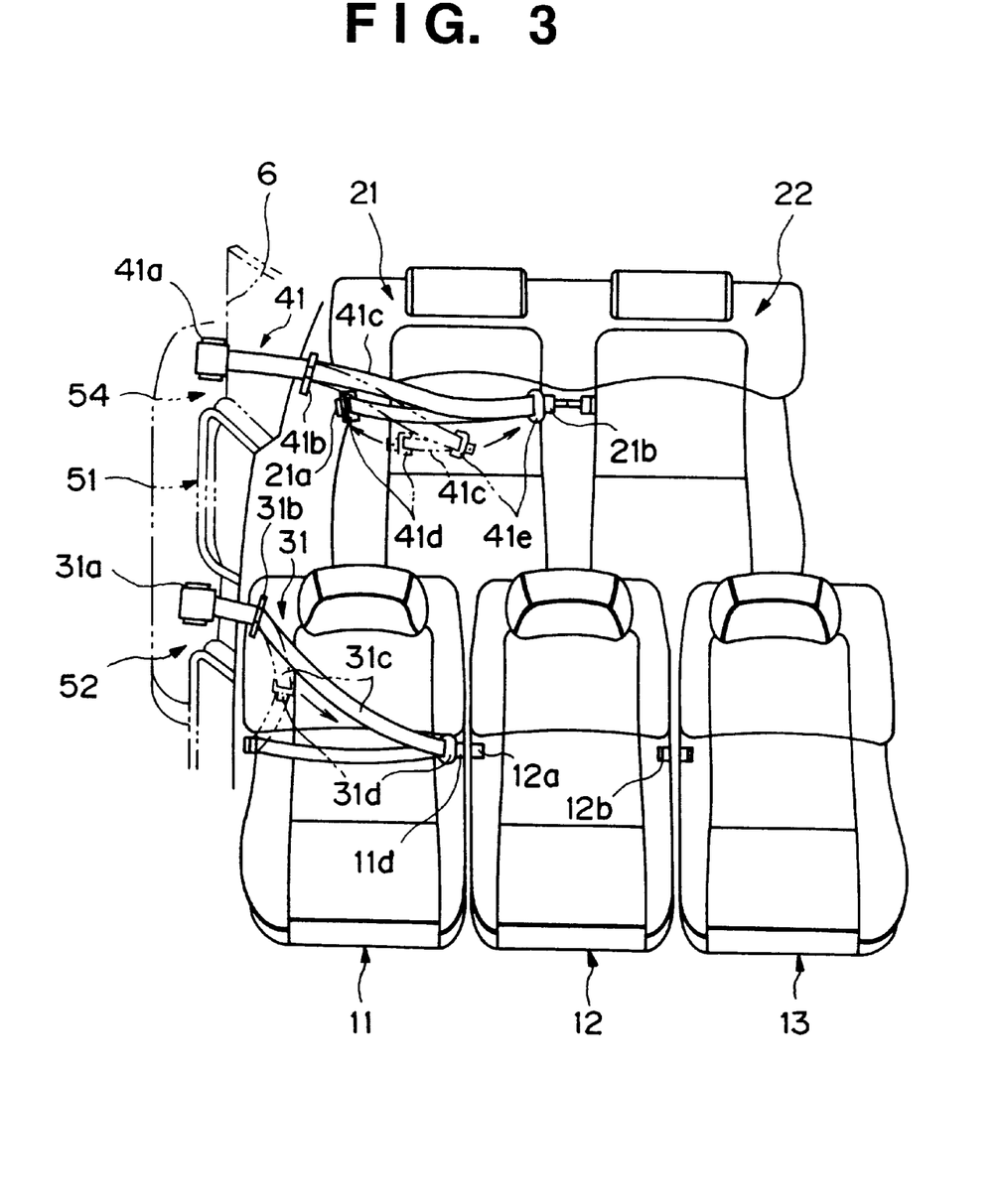
FIG. 3 is a perspective view of the rear part of the inside of the vehicle.

FIGS. 2 and 3 show a rear part of the inside of the vehicle where the second and third rows of seats are arranged. In FIGS. 2 and 3, reference numeral 31 denotes a seat belt unit for the right seat 11 in the second row; and 41, a seat belt unit for the right seat 21 of the third row. Note, in FIGS. 2 and 3, seat belt units for the left seat 13 in the second row and the left seat 22 in the third row are not shown.

The third row is arranged in an elevated position from the position of the second row, as shown in FIG. 2, so that seating position of the third row is higher by H1 than seating position of the second row.

The seat belt unit 31 for the right seat 11 in the second row comprises a retractor 31a mounted on a C pillar 52 which is behind a right-side trim panel 6 and located in front of a rear side window 51, an anchor 31b mounted inside of the vehicle in the trim panel 6 above the C pillar 52, and a webbing 31c which is wound up by the retractor 31a. The webbing 31c is pulled out into the inside of the vehicle through a slit 61 provided on the trim panel 6, and the revealing end of the webbing is fixed on a floor 53. Between the revealing end of the webbing 31c and the anchor 31b, a tang 31d which slides along the webbing 31c is provided.

Figure 4:
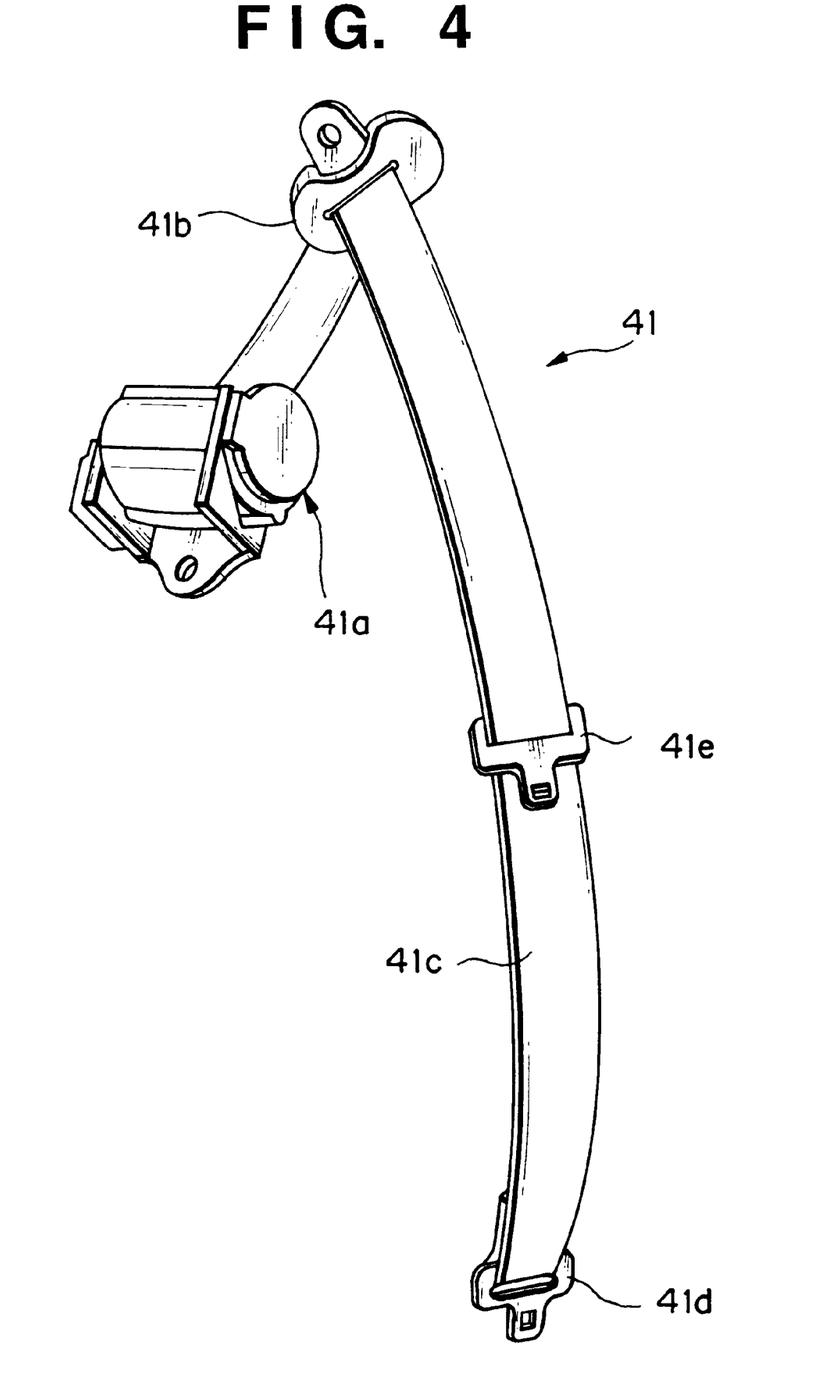
FIG. 4 shows a configuration of a seat belt unit for a third row.

The seat belt unit 41 for the right seat 21 of the third row comprises a retractor 41a mounted on a D pillar 54 which is behind the trim panel 6 and located behind the rear side window 51, an anchor 41b mounted inside of the vehicle on the trim panel 6 above the D pillar 54, and a webbing 41c which is wound up by the retractor 41a. The webbing 41c is pulled out into the inside of the vehicle through a slit 62 provided on the trim panel 6. Further, as shown in FIG. 4, the webbing 41c has two tangs; one is a fixed tang 41d which is fixed at a revealing end of the webbing 41c and the other is a slide tang 41e, provided between the fixed tang 41d and the anchor 41b, which slides along the webbing 41c, differing from the webbing 31c of the seat belt unit 31 of the second row. The webbing 41c has enough length to reach the second row.

The anchor 41b is provided at a higher position by H2 (FIG. 2) than the position of the anchor 31b. Further, the anchors 31b and 41b are respectively configured rotatable about an axis which extends in the width direction of the vehicle. A rotatable angle of the anchor 41b is set greater than a rotatable angle of the anchor 31b. More specifically, the anchor 41b is designed rotatable until it faces toward the second row (refer to a two-dot-dash line showing outline of 41b in FIG. 2).

Next, functions of the seat belt units 31 and 41 are explained in detail.

The seat belt unit 31 is for protecting a passenger seated in the right seat 11 in the second row by fastening the tang 31d to a buckle 11a, provided on the left of the seat 11, as shown in FIGS. 2 and 3. The seat belt unit 41 is for protecting a passenger seated in the right seat 21 of the third row by fastening the fixed tang 41d to a first buckle 21a fixed on the floor 53, then fastening the slide tang 41e to a second buckle 21b provided on the left side of the seat 21.

Figure 5:
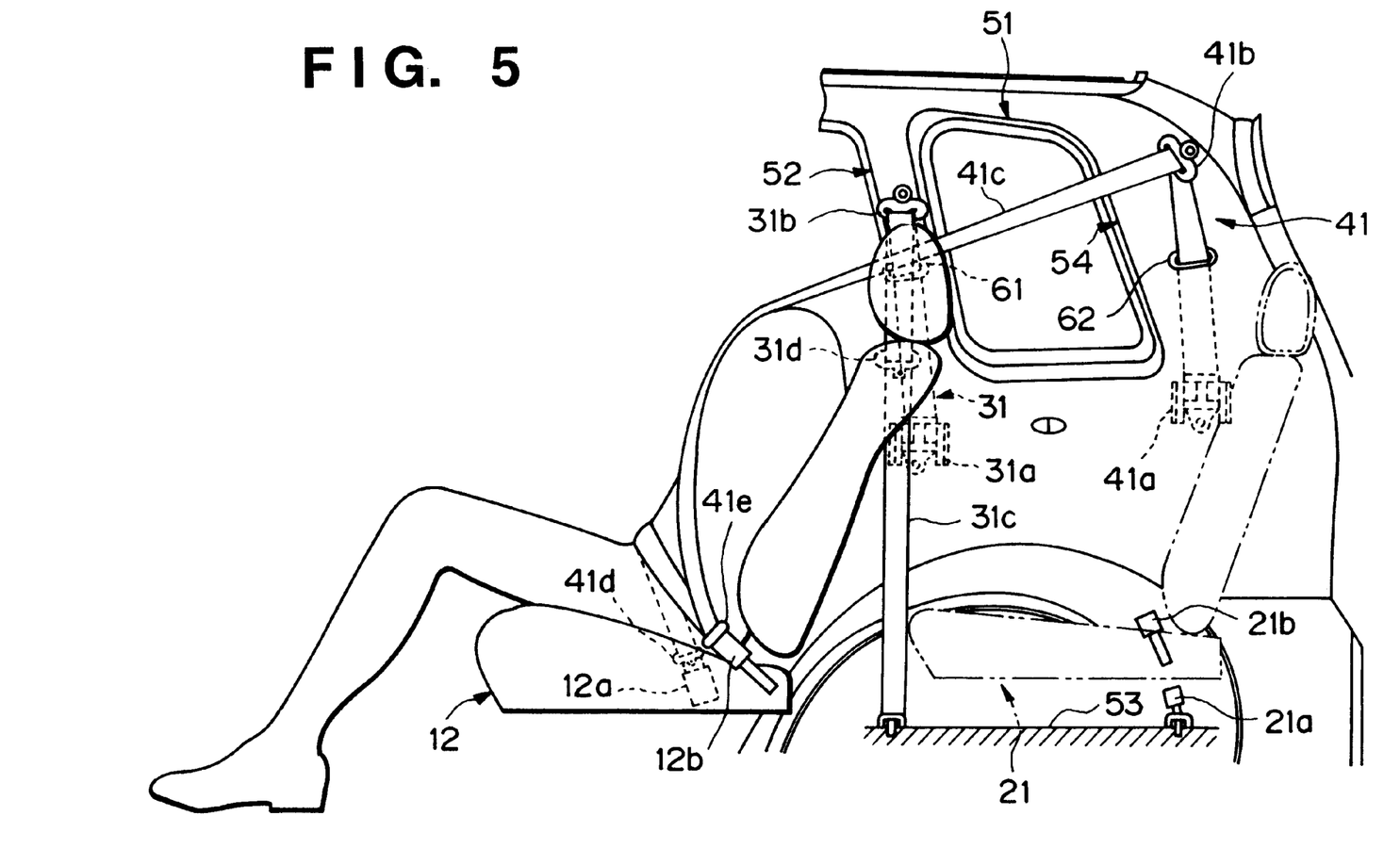
FIG. 5 is a side view showing a case where the seat belt unit for the third row is used for a center seat of the second row.
Figure 6:
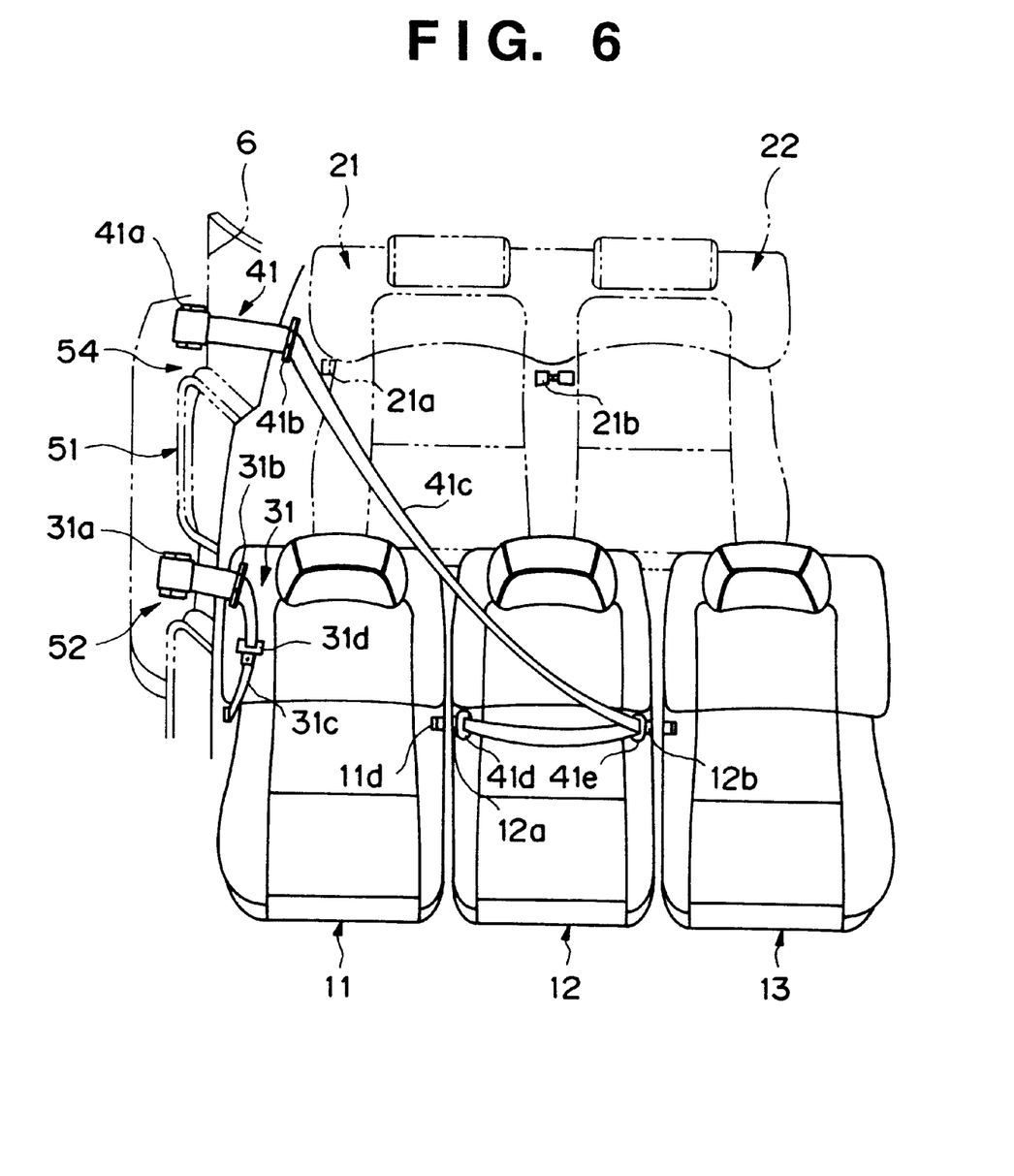
FIG. 6 is a perspective view showing the case where the seat belt unit for the third row is used for the center seat of the second row.

Next, a case where a seat or seats in the third row are detached is explained. As shown in FIGS. 5 and 6, the fixed tang 41d of the seat belt unit 41 is fastened a first buckle 12a provided on the right of the center seat 12 of the second row, then the slide tang 41e is fastened to a second buckle 12b provided on the left side of the center seat 12. In this manner, the seat belt unit 41, provided for the third row, can be used as a seat belt unit for the center seat 12 of the second row.

Since the anchor 41b of the seat belt unit 41 is arranged at a higher position than the position of the anchor 31b of the seat belt unit 31, and the anchor 41b is designed rotatable to completely face to the second row, it is possible to pull out the webbing 41c toward the front, i.e., toward the passenger in the center seat 12 of the second row, at a proper angle from his/her shoulder. Further, since the third row is set at an elevated position from the second row, the webbing 41c is pulled out toward a passenger seated in the right seat 21 of the third row at a proper angle from his/her shoulder. Thus, the seat belt unit 41 can protect both the passenger in the seat 21 of the third row and the passenger in the seat 12 of the second row.

Figure 7:
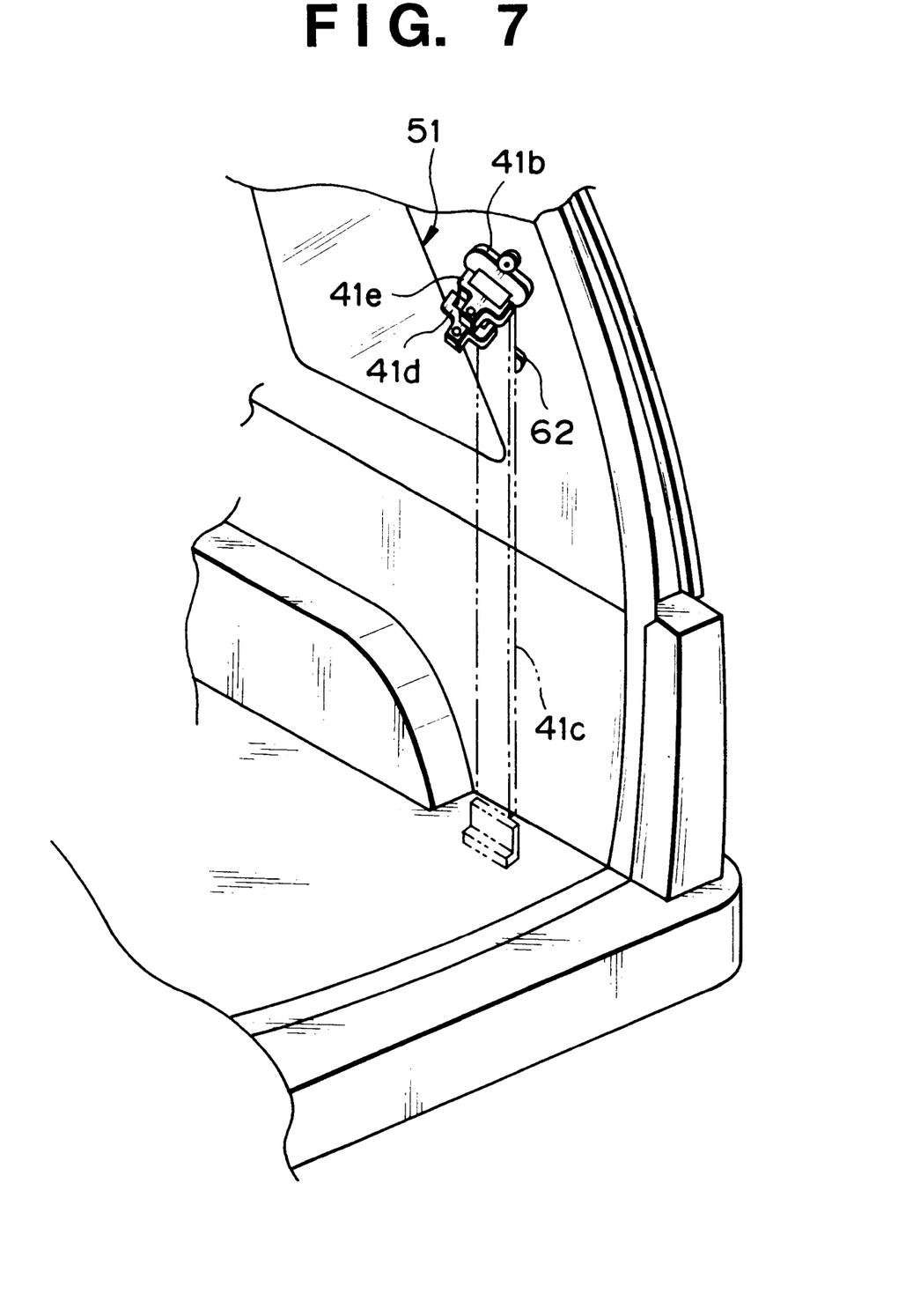
FIG. 7 is a perspective view of a part of the vehicle seen from the back when the seat belt unit for the third row is not used.

Further, as shown in FIG. 7, the webbing 41b is wound up by the retractor 41a until the fixed tang 41d and the slide tang 41e reach the anchor 41b when it is not needed. Accordingly, in a case where a seat or seats in the third row are detached to use the room behind the second row for carrying freight, for instance, with one end of the webbing 41b being fixed on the floor (shown by dot-dash lines in FIG. 7), the webbing 41c does not tangle with the freight while loading and unloading on/from the vehicle. As a result, it increases convenience of the vehicle as well as the inside of the vehicle looks attractive since the webbing 41c is stored behind the trim panel.

According to the embodiment as described above, the seat belt unit 41 for the third row can be also used as a seat belt unit for the center seat 12 of the second row, it is possible to realize an effective use of the seat belt unit 41 when it is not used in the third row.

Further, since the seat belt unit 41 for the third row can be used as a seat belt unit for the center seat 12 of the second row, it is not necessary to design an arrangement of seat belt units in consideration of possible seat arrangements, which reduces cost of vehicle design.

The present invention is not limited to the above embodiment and various changes and modifications can be made within the spirit and scope of the present invention. More specifically, the seat belt unit 41 for the right seat 21 of the third row is used as a seat belt unit for the center seat 12 of the second row in the above embodiment, however, a seat belt unit for the left seat 22 in the third row may be used for the same purpose, for instance.

Further, in the above embodiment, three rows of seats are arranged in the length direction in the vehicle, however, the number of rows of seats is not limited to this. For instance, when a vehicle (e.g., sedan type) has two rows of seats where the front row has a driver's seat, a front passenger seat, and another seat between the two seats, a seat belt unit for the rear seat may be used for the middle seat of the front row.

Furthermore, a case where the present invention is applied to a station wagon is explained in the above embodiment, however, the present invention is also applicable to, e.g., a van having a body of the same shape, but with only two rows of seats, and room behind the second row for freight. By providing the same type of seat belt unit as that of the station wagon to the van, a passenger in the center seat of the second row can use the seat belt unit, anytime. Thus, the same arrangement of seat belt units may be used for a station wagon and a van, which makes possible to reduce manufacturing cost.

Further, the seat belt unit 41 for the third row is used as a seat belt unit for the center seat 12 of the second row when the third row is detached in the above embodiment; however, the present invention is not limited to this, and when at least either one of the right and left seats 21 and 22 in the third row is not occupied, the seat belt unit for the vacant seat can be used for the center seat 12.

According to the seat belt assemblies for a vehicle as described in the above embodiment, it is possible to pull out the webbing of the seat belt unit for the last row until it reaches the center seat of the second to the last seat row, thus, the seat belt unit for the last row is also used for the center seat of the second to the last seat row. Accordingly, the seat belt unit can be shared by the last row and the center seat of the second to the last seat row, thereby it becomes unnecessary to provide a seat belt unit exclusively for the center seat of the second to the last seat row.

Further, seat belt assemblies of the same type can be used in different types of vehicles; thus, a manufacturing cost is reduced. Further, it is unnecessary to design an arrangement of seat belt units by taking the possible seat arrangements into consideration, which reduces cost for designing a vehicle.

Further, according to the seat belt assemblies for a vehicle as described in the above embodiment, only a base end of the webbing has to be fixed on the vehicle body, and it is not necessary to fix the both ends, i.e., the base end and the top end, of the webbing on the vehicle body for configuring a three-point support seat belt unit. Accordingly, the webbing of the seat belt unit provided for the last row can be easily pulled out to the position of the center seat of the second to the last seat row, thereby it is possible to use the seat belt unit provided for the last row for the center seat of the second to the last seat row under proper state of the webbing.

Further, according to the seat belt assemblies for a vehicle as described in the above embodiment, by arranging the anchor of the seat belt unit for the last row in an elevated position from the position of the anchor of the second to the last seat row, when using the seat belt unit, provided for the last row, for the center seat of the second to the last seat row, it is possible to pull the webbing from the rear upper position to the front with respect to a passenger seated in the center seat. Accordingly, the webbing is provided at the optimum angle for the passenger seated in the center seat.

Further, according to the seat belt assemblies for a vehicle as described in the above embodiment, when using the seat belt unit, provided for the last row, for the center seat of the second to the last seat row, angle of webbing is changed to a proper angle.

Further, according to the seat belt assemblies for a vehicle as described in the above embodiment, since the position of seats in the last row is arranged in an elevated position from the position in the second to the last seat row, in a case where the anchor of the seat belt unit for the last row is arranged in the upper position than the position of the anchor for the second to the last seat row, the webbing is provided at an optimum angle for the passenger seated in the last row. Accordingly, the webbing is arranged at the best angle for both a passenger seated in the last row and a passenger seated in the center seat of the second to the last seat row, thereby it is possible to protect either of the passengers.

Further, according to the seat belt assemblies for a vehicle as described in the above embodiment, the seat belt unit for the third row can be used as a seat belt unit for the center seat of the second row when the third row is not used, thereby realizing an effective use of the seat belt unit provided for the third row.

Further, when the seat belt unit for the third row is not used, the webbing is stored behind the trim panel. As a result, when the third row is detached to make room for freight behind the second row, for instance, it is possible to prevent the webbing from tangling with the freight while loading and unloading the freight. In addition, the webbing is not visible when it is not used, thus, the interior of the vehicle looks attractive.

It should be noted that a case where a bench seat is used in the third row, as shown in FIG. 3, is explained in the above embodiment; however, the present invention is not limited to this and also applicable to a case where a plurality of independent seats are installed.

The present invention is not limited to the above embodiments and various changes and modifications can be made within the spirit and scope of the present invention. Therefore to apprise the public of the scope of the present invention, the following claims are made.

What is claimed is:

1. Seat belt assemblies for a vehicle in which plural rows of seats are arranged in a length direction of the vehicle and a second to the last seat row is designed for providing seats for three passengers, wherein a seat belt unit for protecting a passenger on a seat in a last row is configured so that a webbing is pulled out via an anchor, as a fulcrum, provided on a rear pillar of the vehicle, and has enough length to be used as a webbing for protecting a passenger on a center seat, in the width direction, of the second to the last seat row.

2. The seat belt assemblies for the vehicle according to claim 1, wherein said webbing has a fixed tang which is provided at an end of said webbing and a slide tang designed to be slide along said webbing.

3. The seat belt assemblies for the vehicle according to claim 1 comprising a seat belt unit for protecting a passenger in a rightmost or leftmost seat, in the width direction, of the second to the last seat row, wherein a mounting position of the anchor for said webbing of said seat belt unit for the last row is higher than a mounting position of an anchor, as a fulcrum, used when pulling out a webbing of said seat belt unit for the second to the last seat row.

4. The seat belt assemblies for the vehicle according to claim 3, wherein the anchor for said webbing of said seat belt unit for the last row is provided on the rear pillar of the vehicle, and a rotatable range of the anchor about a rotation axis is between a direction for pulling out said webbing toward the last row of seats and a direction for pulling out said webbing toward a seat in the second to the last seat row.

5. The seat belt assemblies for the vehicle according to claim 3, wherein an elevation of a seat of the last row is higher than an elevation of a seat of the second to the last seat row.

6. The seat belt assemblies for the vehicle according to claim 1, wherein the anchor for said webbing of said seat belt unit for the last row is provided on the rear pillar of the vehicle, and a rotatable range of the anchor about a rotation axis is between a direction for pulling out said webbing toward the last row of seats and a direction for pulling out said webbing toward a seat in the second to the last seat row.

7. Seat belt assemblies for a vehicle in which three rows of seats are arranged in a length direction of the vehicle, the second row is designed for providing seats for three passengers, and a seat or seats in the third row is/are detachable or foldable, wherein a seat belt unit for protecting a passenger on a seat of the third row is configured so that a webbing is pulled out via an anchor, as a fulcrum, provided on a rear pillar of the vehicle, has enough length to be used as a webbing for protecting a passenger on a center seat, in the width direction, of the second row, has a fixed tang which is provided at an end of said webbing and a slide tang designed to be slide along said webbing, and is designed to be stored behind a trim panel when wound by a retractor when it is not used.

* * * * *